(12) United States Patent
Kime et al.

(10) Patent No.: US 10,743,150 B2
(45) Date of Patent: *Aug. 11, 2020

(54) SPECIALLY PROGRAMMED COMPUTING DEVICES BEING CONTINUOUSLY CONFIGURED TO UTILIZE ADJUSTABLE IDENTIFIERS TO ALLOW INDIVIDUALS TO HAVE INSTANTANEOUS REAL-TIME TRANSACTING MEETINGS

(71) Applicant: Hopgrade, Inc., Austin, TX (US)

(72) Inventors: John Stuart Kime, Austin, TX (US); Nathan Robert Jones, Austin, TX (US); Christopher Tice Peifer, Greenwich, CT (US); Andrew David Michaelis, Austin, TX (US); Quenby Justina Swinson-Mitchell, Austin, TX (US); David Rodriguez, Austin, TX (US); Nathan Madera, Austin, TX (US)

(73) Assignee: Hopgrade, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/601,026

(22) Filed: Oct. 14, 2019

(65) Prior Publication Data
US 2020/0045511 A1 Feb. 6, 2020

Related U.S. Application Data

(63) Continuation of application No. 16/047,916, filed on Jul. 27, 2018, now Pat. No. 10,448,223, which is a
(Continued)

(51) Int. Cl.
*H04W 4/02* (2018.01)
*H04W 4/20* (2018.01)
(Continued)

(52) U.S. Cl.
CPC .......... *H04W 4/20* (2013.01); *H04L 12/1813* (2013.01); *H04M 3/42008* (2013.01);
(Continued)

(58) Field of Classification Search
CPC .. G06F 3/0482; G06F 3/04842; G06F 3/0488; G06F 3/0481; G06F 3/04817;
(Continued)

(56) References Cited

U.S. PATENT DOCUMENTS

2012/0271883 A1* 10/2012 Montoya ............... H04W 4/023
709/204
2013/0324056 A1* 12/2013 Maguire ............... H01Q 1/245
455/73

* cited by examiner

*Primary Examiner* — Allahyar Kasraian
(74) *Attorney, Agent, or Firm* — Greenberg Traurig, LLP

(57) ABSTRACT

In some embodiments, the present invention provides for a computer system which includes at least the following components: a plurality of computing devices associated with a plurality of users associated with a plurality of users; where each computing device of the plurality of computing devices is configured to: electronically receive software which, when being executed, cause such computing device to display a plurality of instances of a specifically programmed graphical user interface (GUI); where each instance of the GUI is configured to display a real-time updatable meeting information representative of a direct electronic proximity-based communication between at least two computing devices associated with at least two users who desire to meet at a particular location to engage in a transaction of at least one good, at least one service, or both, whose marketable value lasts for a period of 30 seconds to 60 minutes.

32 Claims, 11 Drawing Sheets

Related U.S. Application Data continuation of application No. 15/864,831, filed on Jan. 8, 2018, now abandoned, which is a continuation of application No. 15/368,219, filed on Dec. 2, 2016, now Pat. No. 9,867,021.

(60) Provisional application No. 62/262,015, filed on Dec. 2, 2015.

(51) Int. Cl.
*H04L 12/18* (2006.01)
*H04W 12/02* (2009.01)
*H04M 3/42* (2006.01)
*H04W 4/21* (2018.01)
*H04W 4/80* (2018.01)

(52) U.S. Cl.
CPC ............ *H04W 4/023* (2013.01); *H04W 4/21* (2018.02); *H04W 4/80* (2018.02); *H04W 12/02* (2013.01); *H04M 2203/105* (2013.01); *H04M 2203/2072* (2013.01); *H04M 2203/2094* (2013.01); *H04M 2203/256* (2013.01); *H04M 2203/6045* (2013.01)

(58) Field of Classification Search
CPC ... G06F 3/048; G06F 3/0484; G06Q 30/0261; G06Q 30/0641; G06Q 50/01; G06Q 30/02; G06Q 30/0601; G06Q 30/0621; G06Q 20/32
USPC ....... 455/456.1–457; 705/319; 709/204–207; 715/705–726, 762, 763
See application file for complete search history.

SPECIALLY PROGRAMMED COMPUTING DEVICES BEING CONTINUOUSLY CONFIGURED TO UTILIZE ADJUSTABLE IDENTIFIERS TO ALLOW INDIVIDUALS TO HAVE INSTANTANEOUS REAL-TIME TRANSACTING MEETINGS

RELATED APPLICATIONS

This application is a continuation of U.S. patent application Ser. No. 15/368,219, filed Dec. 2, 2016, entitled "SPECIALLY PROGRAMMED COMPUTING DEVICES BEING CONTINUOUSLY CONFIGURED TO ALLOW UNFAMILIAR INDIVIDUALS TO HAVE INSTANTANEOUS REAL-TIME MEETINGS TO CREATE A NEW MARKETPLACE FOR GOODS AND/OR SERVICES", which claims the priority of U.S. provisional patent application No. 62/262,015; filed Dec. 2, 2015; entitled "SPECIALLY PROGRAMMED COMPUTING DEVICES BEING CONTINUOUSLY CONFIGURED TO ALLOW UNFAMILIAR INDIVIDUALS TO HAVE AN INSTANTANEOUS MEETING TO CREATE A NEW MARKETPLACE FOR GOODS AND/OR SERVICES HAVING A SHORT LIFE," which are incorporated herein by reference in their entirety for all purposes.

FIELD OF INVENTION

In some embodiments, the present invention is related to specifically programmed computing devices (e.g., mobile computing devices) which are being continuously configured to allow unfamiliar individuals to have instantaneous real-time meetings to create a new marketplace for goods and/or services.

BACKGROUND OF THE INVENTION

Certain products and/or service can have a short live. For example, selling your seat for the second half of a football game or briefly wanting the front of the porta potty line at a crowded music festival.

SUMMARY OF THE INVENTION

In some embodiments, the present invention provides for a computer system which includes at least the following components: a plurality of computing devices associated with a plurality of users associated with a plurality of users; where the plurality of users is at least one hundred concurrent users; where each computing device of the plurality of computing devices is configured to: electronically receive software which, when being executed, cause such computing device to display a plurality of instances of a specifically programmed graphical user interface (GUI); where each instance of the GUI is configured to display a real-time updatable meeting information representative of a direct electronic proximity-based communication between at least two computing devices associated with at least two users who desire to meet at a particular location to engage in a transaction of at least one good, at least one service, or both, whose marketable value lasts for a period of 30 seconds to 60 minutes; where the meeting information includes: 1) a first data representative of the particular location; 2) a second data representative of at least one unique user authentication identifier, which has been assigned to: i) a particular computing device of the at least two computing devices or ii) the at least two computing devices; and 3) a third data representative of a real-time adjustable visual indicator, allowing the least two users to visually identify each other computing devices, where the real-time adjustable visual indicator has been uniquely assigned based, at least in part, on at least one other visual indicator being assigned to at least one other computing device to be located in a visual vicinity of the particular location at which the at least two users to meet; where each computing device of the at least two computing devices of the at least two users is further configured to: electronically receive an indication that the at least two users who desire to meet to engage in the transaction of the at least one good, the at least one service, or both, whose marketable value lasts for the period of 30 seconds to 60 minutes; electronically establish the direct electronic proximity-based communication between the at least two computing devices; dynamically determine, in real time, the first data, the second data, and the third data of the meeting information; and dynamically control, based on the meeting information, a visual appearance of the GUI to facilitate the at least two users to meet at the particular location.

In some embodiments, the meeting information includes a fourth data representative of a real-time sharable drawing pad which is shared among the at least two computing devices associated with the at least two users. In some embodiments, the meeting information includes a fifth data representative of an amount of desired compensation for the at least one good, the at least one service, or both; and where each computing device of the at least two computing devices of the at least two users is further configured to dynamically adjust, in real time, the fifth data based on a time which takes for the at least two users to meet.

In some embodiments, the meeting information is configured to maintain an anonymity of the at least two users from each other. In some embodiments, the real-time adjustable visual indicator is one of: color, text, image, and or any combination thereof.

In some embodiments, a first computing device of the at least two computing devices of the at least two users is further configured to display a first real-time adjustable visual indicator including at least one first color; where a second computing device of the at least two computing devices of the at least two users is further configured to display a second real-time adjustable visual indicator including at least one second color; and where the at least one first color is distinct from the at least one second color.

In some embodiments, the second computing device of the at least two computing devices of the at least two users is further configured to dynamically determine the at least one second color based on a random number based algorithm.

In some embodiments, each real-time adjustable visual indicator is displayed over a half of a screen of each computing device of the at least two computing devices of the at least two users.

In some embodiments, each real-time adjustable visual indicator is displayed after the at least two computing devices have established the direct electronic proximity-based communication. In some embodiments, each real-time adjustable visual indicator is displayed by undimming a respective screen of a respective computing device.

In some embodiments, the direct electronic proximity-based communication includes a transmission of the at least one unique user authentication identifier. In some embodiments, the direct electronic proximity-based communication includes at least one of: direct Bluetooth transmissions and direct transmissions at an inaudible audio frequency.

In some embodiments, the first data includes a textual direction, a visual direction, or both, from the current location of the particular user to the particular location at which the at least two users to meet. In some embodiments, the first data includes a distance from a current location of a particular user to the particular location at which the at least two users to meet.

In some embodiments, the present invention provides for a computer-implemented method which includes at least the following steps of: electronically receiving, by each computing device of a plurality of computing devices associated with a plurality of users, software which, when being executed, cause such computing device to display a plurality of instances of a specifically programmed graphical user interface (GUI); where the plurality of users is at least one hundred concurrent users; where each instance of the GUI is configured to display a real-time updatable meeting information representative of a direct electronic proximity-based communication between at least two computing devices associated with at least two users who desire to meet at a particular location to engage in a transaction of at least one good, at least one service, or both, whose marketable value lasts for a period of 30 seconds to 60 minutes; where the meeting information includes: 1) a first data representative of the particular location; 2) a second data representative of at least one unique user authentication identifier, which has been assigned to: i) a particular computing device of the at least two computing devices or ii) the at least two computing devices; and 3) a third data representative of a real-time adjustable visual indicator, allowing the least two users to visually identify each other computing devices, where the real-time adjustable visual indicator has been uniquely assigned based, at least in part, on at least one other visual indicator being assigned to at least one other computing device to be located in a visual vicinity of the particular location at which the at least two users to meet; electronically receiving, by each of the at least two computing devices of the at least two users, an indication that the at least two users who desire to meet to engage in the transaction of the at least one good, the at least one service, or both, whose marketable value lasts for the period of 30 seconds to 60 minutes; electronically establishing, by each of the at least two computing devices of the at least two users, the direct electronic proximity-based communication between the at least two computing devices; dynamically determining, in real time, by each of the at least two computing devices of the at least two users, the first data, the second data, and the third data of the meeting information; and dynamically controlling, by each of the at least two computing devices of the at least two users, based on the meeting information, a visual appearance of the GUI to facilitate the at least two users to meet at the particular location.

BRIEF DESCRIPTION OF THE DRAWINGS

The present invention can be further explained with reference to the attached drawings, wherein like structures are referred to by like numerals throughout the several views. The drawings shown are not necessarily to scale, with emphasis instead generally being placed upon illustrating the principles of the present invention. Therefore, specific structural and functional details disclosed herein are not to be interpreted as limiting, but merely as a representative basis for teaching one skilled in the art to variously employ the present invention.

DETAILED DESCRIPTION OF THE INVENTION

Figure 1:
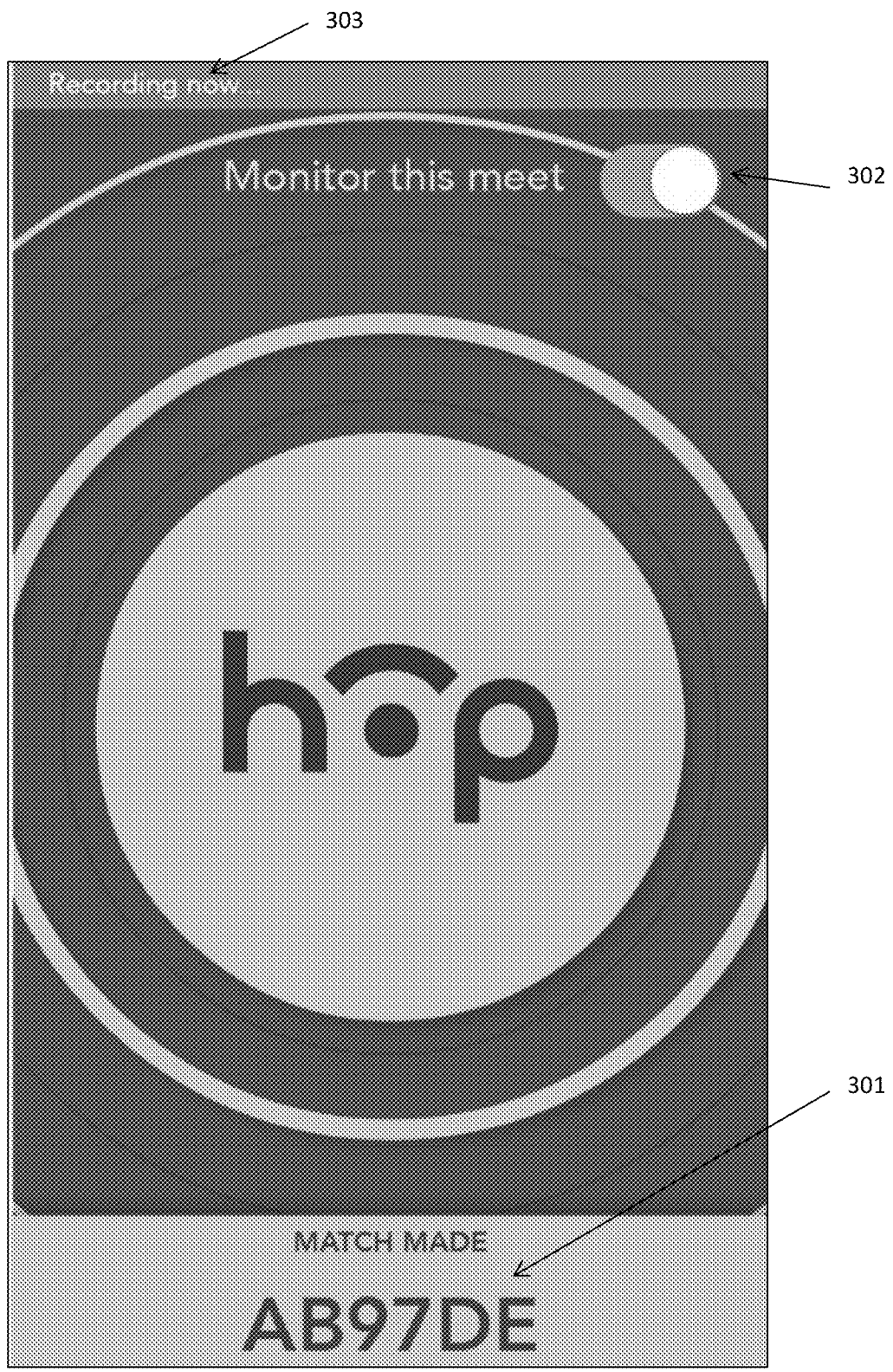
FIGS. 1-7 illustrate various specialized graphical user interfaces (GUIs) programmed to function in accordance with some principles of some embodiments of the present invention.

Among those benefits and improvements that have been disclosed, other objects and advantages of this invention can become apparent from the following description taken in conjunction with the accompanying figures. Detailed embodiments of the present invention are disclosed herein; however, it is to be understood that the disclosed embodiments are merely illustrative of the invention that may be embodied in various forms. In addition, each of the examples given in connection with the various embodiments of the present invention is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. In some embodiments, the terms "instantaneous," "instantaneously," "instantly," and "in real time" refer to a condition where a time difference between a first time when a search request is transmitted and a second time when a response to the request is received is no more than 1 second. In some embodiments, the time difference between the request and the response is between less than 1 second and several seconds (e.g., 5-10 seconds).

As used herein, the term "dynamic(ly)" means that events and/or actions can be triggered and/or occur without any human intervention. In some embodiments, events and/or actions in accordance with the present invention can be in real-time and/or based on a predetermined periodicity of at least one of: nanosecond, several nanoseconds, millisecond, several milliseconds, second, several seconds, minute, several minutes, hourly, etc.

In some embodiments, the inventive electronic systems includes electronic mobile devices (e.g., smartphones, etc.) of users and server(s) in the distributed network environment, communicating over a suitable data communication network (e.g., the Internet, etc.) and utilizing at least one suitable data communication protocol (e.g., IPX/SPX, X.25, AX.25, AppleTalk™, TCP/IP (e.g., HTTP), etc.). In some embodiments, a plurality of users can be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-10,000,000,000).

In some embodiments, exemplary inventive specifically programmed computing devices, exemplary inventive computer-programmed systems, and exemplary inventive computer-processing methods of the present invention allow to have a meeting and/or to consummate a transaction regarding a good and/or service having a short life by (1) at least two strangers who are unfamiliar with each other and/or (2) at least two individuals who cannot visually identify each other from a distance due to visual difficulties (e.g., darkness, physical obstacles (e.g., physical structures impeding the view, crowd, etc.), etc.)). In some embodiments, the term "short life" as used here is based on a type of a good/service and calculated based on customary life expectancy for such product/service. For example, the short life can be a second to 60 minutes. In another example, the short life can be 10 seconds to 60 minutes. In another example, the short life can be 30 seconds to 60 minutes. In another example, the short life can be 1 minute to 60 minutes. In another example, the short life can be 10 minute to 60 minutes. In another example, the short life can be 10 minute to 30 minutes. In another example, the short life can be 30 minute to 60 minutes.

For example, an illustrative example of a good having the short life (e.g., a second to 60 minutes) is to offer one's seat at a stadium for the second half of a football game when a person desires to leave after the first half. Another example, a person desires the front of the porta potty line at a crowded event.

In some embodiments, exemplary inventive specifically programmed computing devices, exemplary inventive computer-programmed systems, and exemplary inventive computer-processing methods of the present invention are configured to take into account an exemplary LifeTime Value (LTV) formula per computing device (e.g., mobile device). For example, by minimizing seconds and/or minutes that would otherwise take to complete a meet, the present invention increase the amount of transactions per hour for sellers which increase the average LTV. In another example, the present invention is configured to dynamically adjust (up or down) an amount of desired compensation (i.e., a transaction value) based on a time which takes to complete the meet. For instance, the present invention is configured to allow a seller to obtain a maximum compensation for a quicker meet. In turn, the present invention is configured to allow a buyer to realize a maximum time value.

In some embodiments, exemplary inventive specifically programmed computing devices, exemplary inventive computer-programmed systems, and exemplary inventive computer-processing methods of the present invention allow to mitigate the uncertainty of transacting with a stranger. In some embodiments, exemplary inventive specifically programmed computing devices, exemplary inventive computer-programmed systems, and exemplary inventive computer-processing methods of the present invention allow to authenticate the presence and identity of the other smart device in person using a direct phone-to-phone communication, minimizing an opportunity for defrauding the identity of either party. For example, using a phone to phone authentication mechanism to validate the identity of either party. In some embodiments, exemplary inventive specifically programmed computing devices, exemplary inventive computer-programmed systems, and exemplary inventive computer-processing methods of the present invention allow to verify smart devices in places without mobile networks, limited mobile networks (e.g., concrete buildings, caves, Montana) and/or poor data service (e.g., a packed Austin City Limits).

In some embodiments, exemplary inventive specifically programmed computing devices, exemplary inventive computer-programmed systems, and exemplary inventive computer-processing methods of the present invention allow to protect the anonymity (i.e., the real identity) of meeting parties but still have a transaction by creating cognitive ease for both parties to continue the transaction. For example the exemplary inventive specifically programmed computing devices, the exemplary inventive computer-programmed systems, and the exemplary inventive computer-processing methods of the present invention allow both sides to be presented with the expected identity prior to the computing devices (e.g., Android-run smartphones and tablets, iPad™, iWatch™).

Illustrative Mechanism for Computing Device Identifications

In some embodiments, the exemplary inventive specifically programmed computing devices, the exemplary inventive computer-programmed systems, and the exemplary inventive computer-processing methods of the present invention utilize a scheme of at least two colors (e.g., RGB colors) to visually signal/identify the inventive computing devices (e.g., smartphones). For example, a first color is used as the visual aid on both smartphones by, for example but not limiting to, fill the entire background of a screen with this first color to make the phone easily identifiable even from a particular distance such as, for example, 1-100 meters (e.g., 50 meters). For example, a second color, being a contrasting color with respect to the first color is being used to minimize/prevent a potential fraud. In some embodiments, the exemplary inventive specifically programmed computing devices, the exemplary inventive computer-programmed systems, and the exemplary inventive computer-processing methods of the present invention utilize an algorithm (e.g., a random number based algorithm) to select/determine the second color. For example, the second color is used to minimize a scenario when an unauthorized computing device is being used to mimic the signal when another device of a non-meet participant and/or the non-meet participant himself or herself identifies the first color from afar and, then, uses the first color to intercept the meet. For example, in some embodiments, the second color is only revealed after the exemplary inventive specifically programmed computing devices and/or the exemplary inventive computer-programmed systems detect the other device via a proximity based confirmation (e.g., Bluetooth™ and/or inaudible audio).

For example, in a scenario of the dark surroundings (e.g., a pitch black, shoulder-to-shoulder concert at a nightclub), the exemplary inventive specifically programmed computing devices and the exemplary inventive computer-programmed systems of the present invention can automatically undim the inventive computing devices (devices which have been specifically programmed with a specialized software configured to instruct in accordance with the present invention detailed herein) to make the signals more visible. The second case is created by the accuracy limitations of current generation location based services technologies (GPS Polling, Wi-Fi Shadowing, Bluetooth Sniffing). For example, it is substantially faster for a delivery driver racing down 7th Avenue to spot a person waving a red (yellow or whatever color we told him to look for) phone than the two people using the coordinates provided by the other's smart device (which can be the wrong block or wrong side of the street). In some embodiments, the exemplary inventive specifically programmed computing devices, the exemplary inventive computer-programmed systems, and the exemplary inventive computer-processing methods of the present invention utilize a location based algorithm to select distinct primary colors to minimize the chance of two meetings in the same area all looking for the same color.

In some embodiments, the exemplary inventive specifically programmed computing devices, the exemplary inventive computer-programmed systems, and the exemplary inventive computer-processing methods of the present invention utilize at least one unique secret key to authenticate the presence of the other smart device without using the Internet. For example, in some embodiments, the key can be random and unique to each transaction. In some embodiments, the exemplary inventive specifically programmed computing devices, the exemplary inventive computer-programmed systems, and the exemplary inventive computer-processing methods of the present invention utilize the static symmetric key and a counter to implement an HMAC-based One Time Password (HOTP) algorithm over both Bluetooth™ and/or, based on availability, inaudible audio when the phones are sufficiently in close proximity with each other, as, for example, being described in Request for Comments: 6287 (RFC6287, Internet Engineering Task Force (IETF), 2011, incorporated by reference herein for all related purposes. For example, the exemplary inventive specifically programmed computing devices, the exemplary inventive computer-programmed systems, and the exemplary inventive computer-processing methods of the present invention can cause the key to be encoded and transmitted within in the advertising packet of the Bluetooth™ signal.

In some embodiments, the exemplary inventive specifically programmed computing devices, the exemplary inventive computer-programmed systems, and the exemplary inventive computer-processing methods of the present invention utilize a shared secret identifier which can be in the form of at least one of: a keyword, a phrase and/or an image. For example, both phones get the same secret identifier which is not revealed until the smartphones have authenticated the proximity of the other's device. For instance, the presence of the anticipated keyword on the other party's phone produces confidence and cognitive ease. For example, in some embodiments, the exemplary inventive specifically programmed computing devices, the exemplary inventive computer-programmed systems, and the exemplary inventive computer-processing methods of the present invention utilize words, images and/or phrases that are easy to identify like "banana" or "zebra" to minimize verification time.

In some embodiments, the exemplary inventive specifically programmed computing devices, the exemplary inventive computer-programmed systems, and the exemplary inventive computer-processing methods of the present invention are configured to define/select at least one location for a meeting place.

In some embodiments, the exemplary inventive computer-programmed systems, and the exemplary inventive computer-processing methods of the present invention are configured to manage at least the following three exemplary types of meeting protocols:

1) a buyer traveling to a stationary seller;
 2) a seller traveling to a stationary buyer; or
 3) both the buyer and the seller are traveling to a mutual location.

In some embodiments, the exemplary inventive specifically programmed computing devices, the exemplary inventive computer-programmed systems, and the exemplary inventive computer-processing methods of the present invention can utilize a three-way chat module to communicate instructions between the buyer's computing device, the seller's computing device, and at least one server mediating the meeting process. In some embodiments, the exemplary inventive specifically programmed computing devices, the exemplary inventive computer-programmed systems, and the exemplary inventive computer-processing methods of the present invention allow the seller to choose if the buyer needs to come to him or he will deliver. In some embodiments, the exemplary inventive computer-programmed systems, and the exemplary inventive computer-processing methods of the present invention are configured to define/initiate each meeting with at least one stationary party (e.g., a stationary buyer, a stationary seller) to assist parties determine a mutually agreed upon location. In some embodiments, the exemplary inventive computer-programmed systems and the exemplary inventive computer-processing methods of the present invention are configured to determine/select a mutual location to which both parties need to travel. For example, there can be a list of locations (e.g., predetermined safe locations (e.g., police, fire departments, other public places, etc.) and directing both parties to the closest one for at least one party or both parties.

Exemplary Initiation of the Meeting

In some embodiments, an exemplary inventive computer-programmed system of the present invention initiates the meeting between the transacting parties, by having at least one server being programmed to communicate, of a network (e.g., the Internet) the colors, key(s), and shared secret(s) to the exemplary inventive programmed computing devices of the parties. For example, both devices (e.g., smartphones) transmit back their current locations and continually transmit in locations via, for example, background services (e.g., GPS-based, Bluetooth-based, etc.) on the devices. In some embodiments, the exemplary inventive specifically programmed computing devices, the exemplary inventive computer-programmed system, and the exemplary inventive computer-processing methods of the present invention are programmed to transmit and process the location identifying data in accordance with, but not limited to:

1) Location and Maps Programming Guide for iOS™ operating system, by Apple Inc. (Cupertino, Calif.), incorporated herein in the entirety for such purpose; and
 2) Making Your App Location-Aware for Android™ operating system, by Google Inc. (Mountain View, Calif.), incorporated herein in the entirety for such purpose.

For example, in the response message from the API, the exemplary inventive computer-programmed system of the present invention continuously includes the most recent location of a particular computing device so the accurate current distance can be continuously calculated during the entire meet. In some embodiments, the exemplary inventive computer-programmed system of the present invention is programmed to utilize the current distance and velocity to vary the location update interval to maximize battery life on both devices. For example, the further the smartphones are apart from each other the less frequently the phones need to update their current locations. As they get closer their update interval needs to increase until the proximity is confirmed via, for example, Bluetooth™ and/or inaudible audio at which point the location services can be turned off automatically. In some embodiments, the exemplary inventive computer-programmed system of the present invention can be programmed to utilize the following rules to determine the length of the location updating time interval, but not being limited to:

i) Less than 100 m-1 second intervals;
ii) Less than 500 m-3 second intervals;
iii) Less than 1 km-6 second intervals;
iv) Less than 5 km-30 second intervals;
v) Less than 10 km-60 second intervals;
vi) Less than 50 km-180 second intervals;
vii) Less than 100 km-300 second intervals; and
viii) Greater than 100 km-600 second intervals.

Exemplary Illustrative Programming Utilized to Calculate the Meeting Distance

In some embodiments, the exemplary inventive computer-programmed system of the present invention can be programmed (Javascript) to calculate the meeting distance by utilizing the "Haversine" formula as follows:

```
function getDistanceFromLatLonInKm(lat1,lon1,lat2,lon2) {
    var R = 6371; // Radius of the earth in km
    var dLat = deg2rad(lat2-lat1); // deg2rad below
    var dLon = deg2rad(lon2-lon1);
    var a =
        Math.sin(dLat/2) * Math.sin(dLat/2) +
        Math.cos(deg2rad(lat1)) * Math.cos(deg2rad(lat2)) *
        Math.sin(dLon/2) * Math.sin(dLon/2)
        ;
    var c = 2 * Math.atan2(Math.sqrt(a), Math.sqrt(1-a));
    var d = R * c; // Distance in km
    var e = d * 1000; // Distance in meters
    return e;
}
function deg2rad(deg) {
    return deg * (Math.PI/180)
}
```

In some embodiments, the exemplary inventive computer-programmed system of the present invention can be further programmed to transmit the meeting instructions to the exemplary inventive specifically programmed computing devices (e.g., smartphones) of both parties. For example, these instructions are determined, by the exemplary inventive computer-programmed system of the present invention, based on the distance between the phones, as, for example but not limited to, follows:

```
var NEEDS_TRANSPORTATION_DIRECTIONS_THRESHOLD = 1000; //in meters
var VISUALLY_IDENTIFIABLE_THRESHOLD = 40; //in meters
if(canVerifyOthersBluetooth( )) {
    PlayHotterAndColder( );
    ShowAuthentication( );
}
var distance = getCurrentDistance( );
if(distance < VISUALLY_IDENTIFIABLE_THRESHOLD) {
        PromptToWaveSignal( );
} else if(distance > NEEDS_TRANSPORTATION_DIRECTIONS_THRESHOLD) {
    SendInstructionsAndDrivingDirections( );
} else
    SendInstructionsAndWalkingDirections( );
}
```

Exemplary Illustrative Implementation Based on "Warmer, Warmer, Red Hot" Principle In some scenarios, when the visual signaling is impeded and/or disruptive (e.g., the visual signal is not readily visible due to ambient light challenges of full sun on the screen), the exemplary inventive computer-programmed system of the present invention can be further programmed to instruct the exemplary inventive specifically programmed computing devices of the parties (e.g., smartphones) to utilize, but not limited to, the decibel level of the Bluetooth™ signal of the other party's phone to play the "hotter/colder" handshake, based on the following exemplary logic, but not limited to:

```
var previousDB =
getCurrentDecibelReadingOfOtherPhoneUsingTheAdvertisingPacket( );
    while (true) {
        var currentDB =
getCurrentDecibelReadingOfOtherPhoneUsingTheAdvertisingPacket( );
        if(currentDB > previousDB) {
            displayWarmer( );
        } else if(currentDB < previousDB) {
            displayColder( );
        }
        previousDB = currentDB;
    }
```

In some embodiments, the exemplary inventive specifically programmed computing devices, the exemplary inventive computer-programmed systems, and the exemplary inventive computer-processing methods of the present invention can be configured to implement this illustrative example of the "hotter/colder" handshake via advertising packet(s) being transmitted and received in:

1) the iOS-based environment, as, for example, detailed in Core Bluetooth Programming Guide, by Apple Inc. (Cupertino, Calif.), incorporated herein in the entirety for such purpose; and
2) in the Android-based environment, as, for example, detailed in AdvertiseData API by Google Inc. (Mountain View, Calif.), incorporated herein in the entirety for such purpose.

In some embodiments, a range of the Hotter/Colder game can be extended using a hidden WI-FI signal that uses the unique secret key as a SSID. This method is obscure but not secure and aids in navigating the two individuals toward each other.

Exemplary Illustrative Implementations of Authentication Functionality

In some embodiments, the exemplary inventive computer-programmed system of the present invention can be further programmed to confirm the identity of the other party using at least one identifier that can be provided and verified during the in-person meeting. For example, the exemplary inventive computer-programmed system of the present invention can utilize the unique secret key functionality and a keyed-hash message authentication code (HMAC)-based one-time password (HOTP) algorithm embed in a current encrypted message in the Bluetooth™ advertising packet of a first exemplary inventive specifically programmed computing device (e.g., smartphone) of a first meeting party. The other exemplary inventive specifically programmed computing device (e.g., smartphone) of a second meeting party is seeking for the mac address and the encrypted message to match its expected values. If either value doesn't have the match, the exemplary inventive computer-programmed system of the present invention generates the Invalid Identity alert. For example, the exemplary inventive computer-programmed system of the present invention can utilize programming routines detailed in, but not limited to, Core Bluetooth Programming Guide by Apple Inc. (Cupertino, Calif.), incorporated herein in the entirety for such purpose, to transmit and receive this advertising packet on the iOS™ operating system.

For example, the exemplary inventive computer-programmed system of the present invention can also utilize programming routines detailed in, but not limited to, Advertise data packet container for Bluetooth LE advertising by Google Inc. (Mountain View, Calif.), incorporated herein in the entirety for such purpose, to transmit and receive this advertising packet on the Android™ operating system.

In some embodiments, when the smartphones may have Bluetooth™ functionality disabled, the exemplary inventive computer-programmed system of the present invention can be further programmed to utilize microphones and speakers of the exemplary inventive specifically programmed computing devices (e.g., smartphones) of both meeting parties to complete the authentication over the inaudible audio. In some embodiments, even when the smartphones may have Bluetooth™ functionality enabled, the exemplary inventive computer-programmed system of the present invention can be further programmed to utilize the inaudible audio mechanism as the main or additional verification step. For example, the exemplary inventive computer-programmed system and the exemplary inventive specifically programmed computing devices (e.g., smartphones) of the present invention can utilize Chirp™ API implementation (Chirp, London, UK), incorporated herein in the entirety for such purpose, to perform the inaudible audio verification step.

In some embodiments, the exemplary inventive specifically programmed computing devices, the exemplary inventive computer-programmed systems, and the exemplary inventive computer-processing methods of the present invention utilize frequencies higher than 18 kHz for transmitting data between computing devices (e.g., smartphones) so that humans can't detect it, and, because the audio transmission is effective at a relatively short range (e.g., 1 meter-100 meter), it is difficult to emulate, and thus adding a level of complexity in defrauding the meeting.

In some embodiments, the exemplary inventive specifically programmed computing devices, the exemplary inventive computer-programmed systems, and the exemplary inventive computer-processing methods of the present invention utilize the authentication protocol that includes a live, shared multi-gesture control, such as a "shared doodle pad." For example, all parties of the meetup share the same virtual doodle pad so that any one party can draw anything real time on their own computing device (e.g., smartphone, tablet) and personally confirm that the other computing device(s) (e.g., smartphone(s), tablet(s)) has/have the same gesture/drawing.

Exemplary Illustrative Implementations of Meeting Mediation Functionality

In some embodiments, the exemplary inventive specifically programmed computing devices, the exemplary inventive computer-programmed systems, and the exemplary inventive computer-processing methods of the present invention utilize the secondary key color and the shared secret image to establish the communication for the meeting after the computing devices (e.g., smartphones) have been authenticated electronically, we need to communicate it to the users.

Illustrative Scenarios in Accordance with Present Inventions

Figure 2:
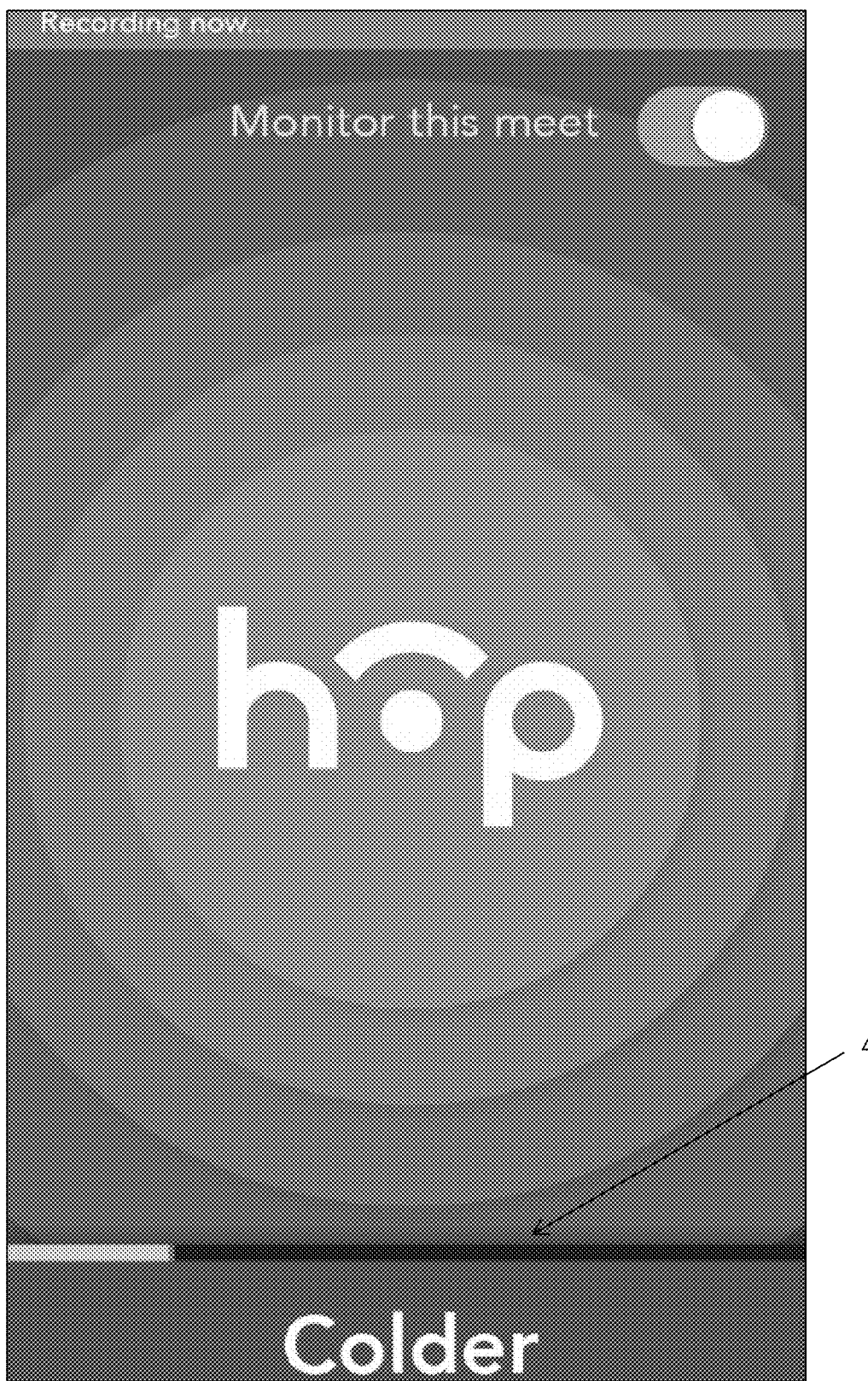
Figure 3:
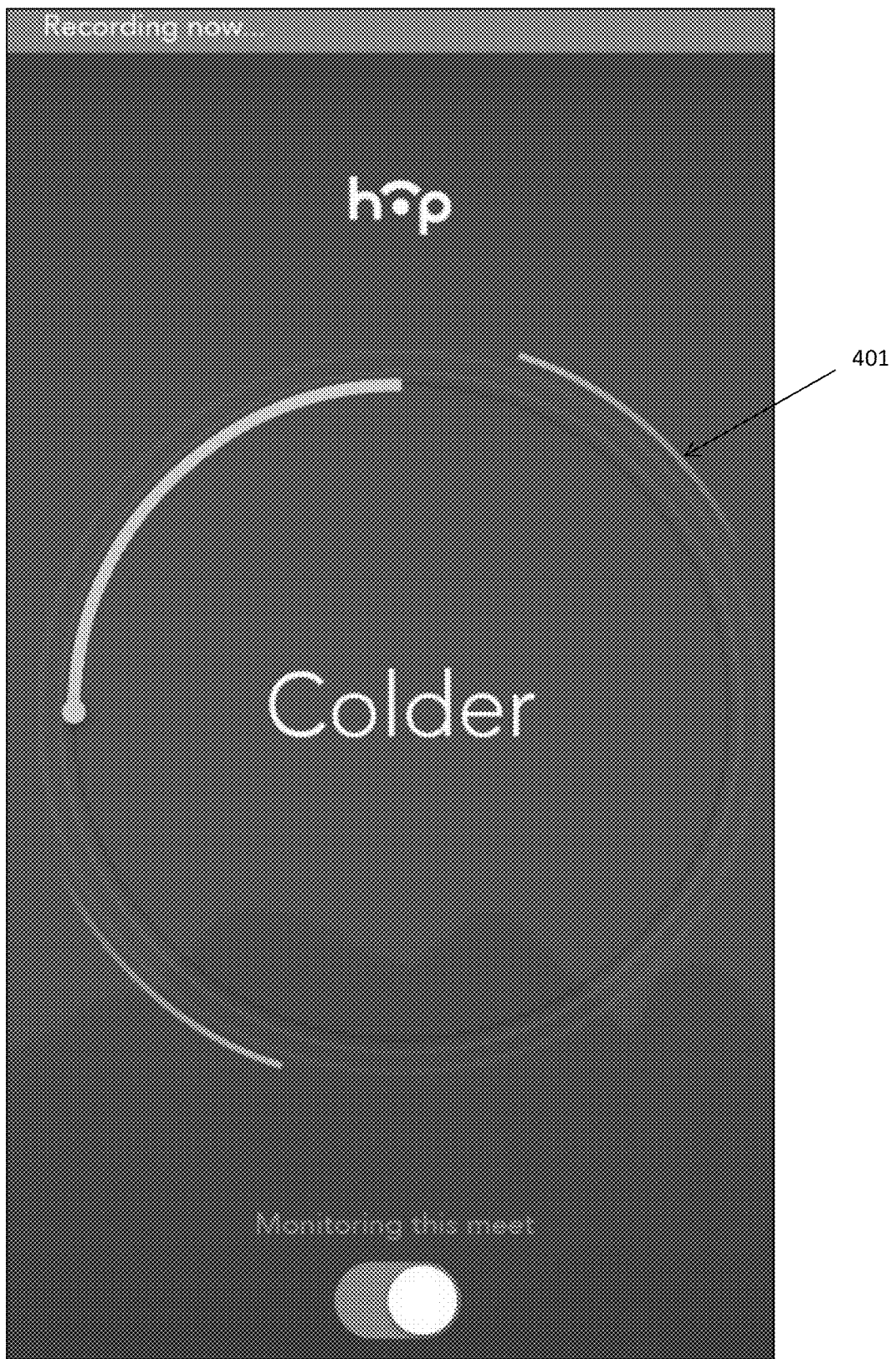

FIGS. 1-3 show snapshots of various interactive states of a user graphical interface (GUI) shown at the inventive computing device (e.g., a smartphone running an app supported by the exemplary inventive computer-programmed system of the present invention) which has been specifically programmed to operate in accordance with the principles of the present invention detailed herein. FIG. 1 shows the specialized GUI illustrating: the secret key 301 which assist in authentication process; an indicator 302, allowing a user to turn on/off external monitoring of a meeting, including automating recording and/or the analysis of such recording to identify potential safety danger condition(s); and an indicator 303, identifying what type of the external monitoring is in progress.

FIG. 2 shows the specialized GUI, illustrating an indicator 401, identifying a relative location position of a first smartphone carried by a first party with respect to (1) a meeting location, (2) a current location of a second smartphone carried by a second party; or (3) both.

FIG. 3 shows another specialized GUI, illustrating an indicator 501, identifying a relative location position of a first smartphone carried by a first party with respect to (1) a meeting location, (2) a current location of a second smartphone carried by a second party; or (3) both.

Figure 4:
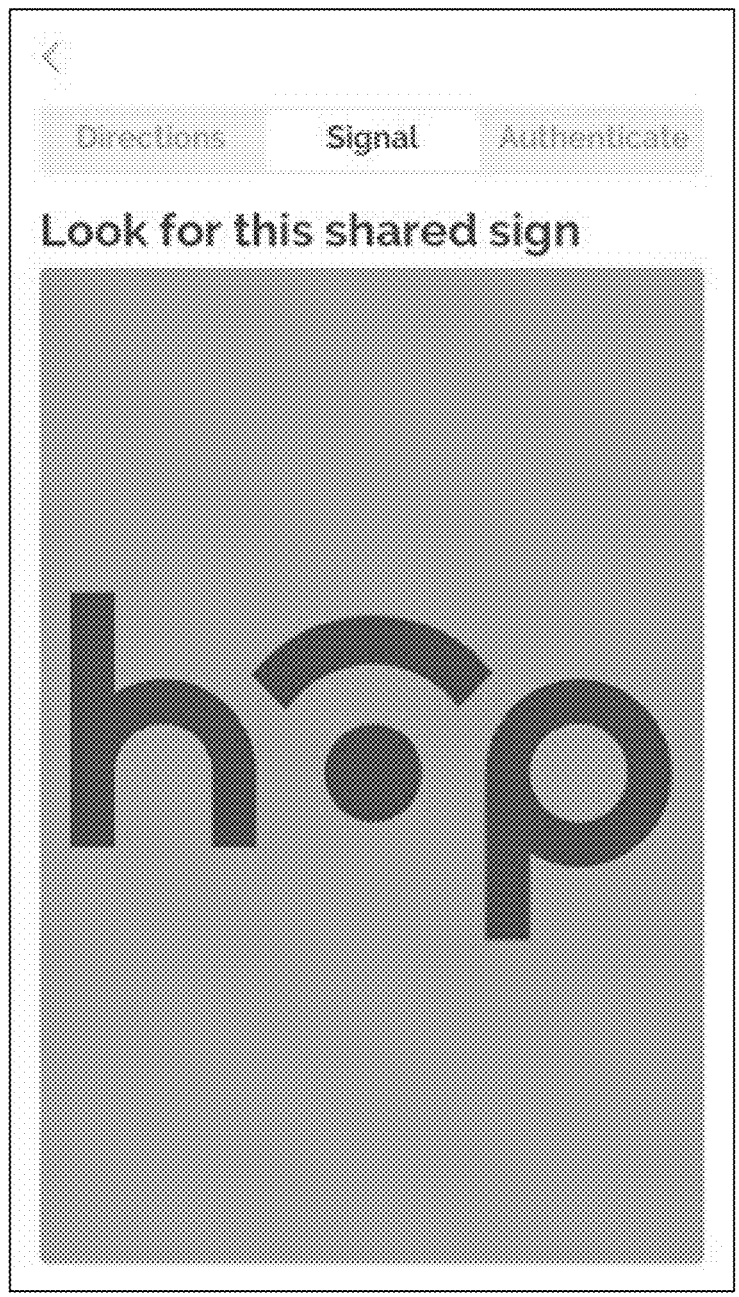

FIG. 4 shows another specialized GUI, illustrating an unique sign for a particular meet within a particular geographic locale.

Figure 5:
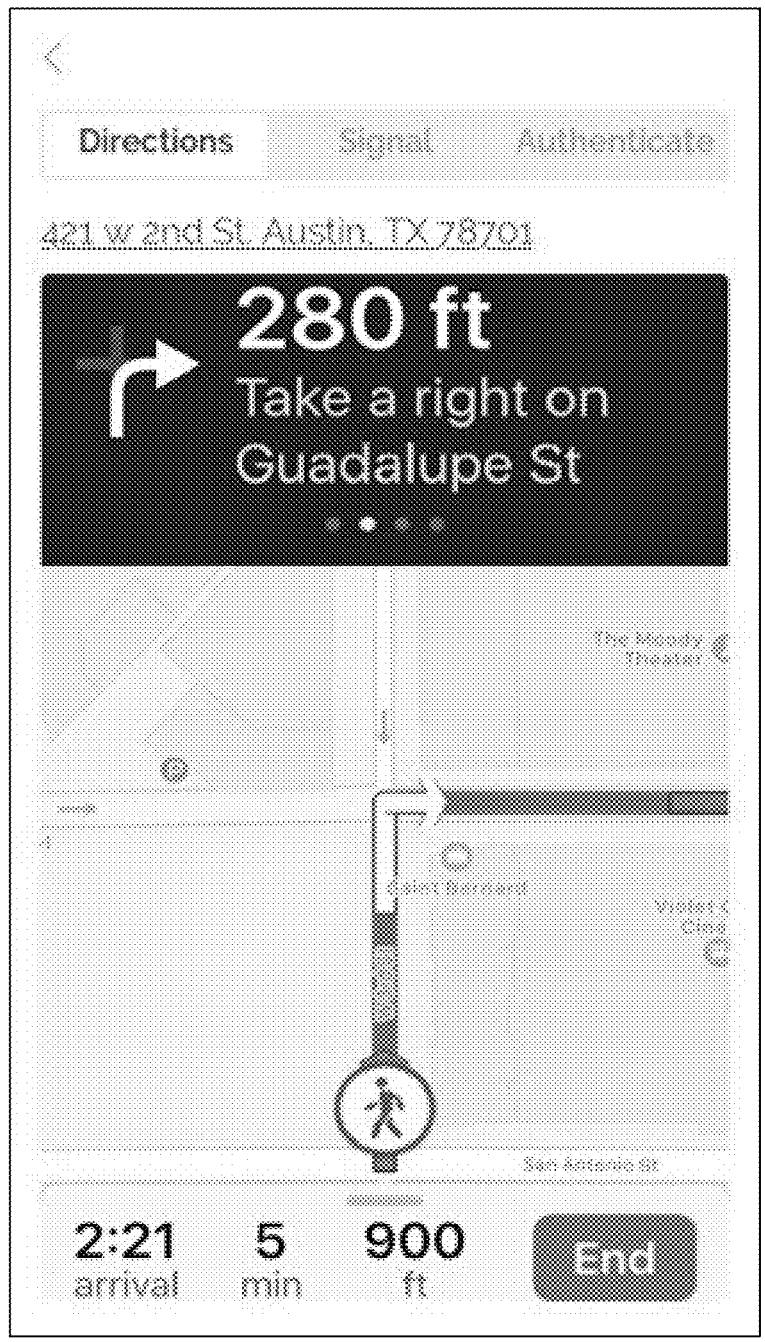

FIG. 5 shows another specialized GUI, illustrating details for a particular meet, such as, an address of the a meeting place, a distance to the meeting place, an arrival time, a time to reach the meeting place, and a map of a particular geographical locale related to the meeting place with a visual direction pointer.

Figure 6:
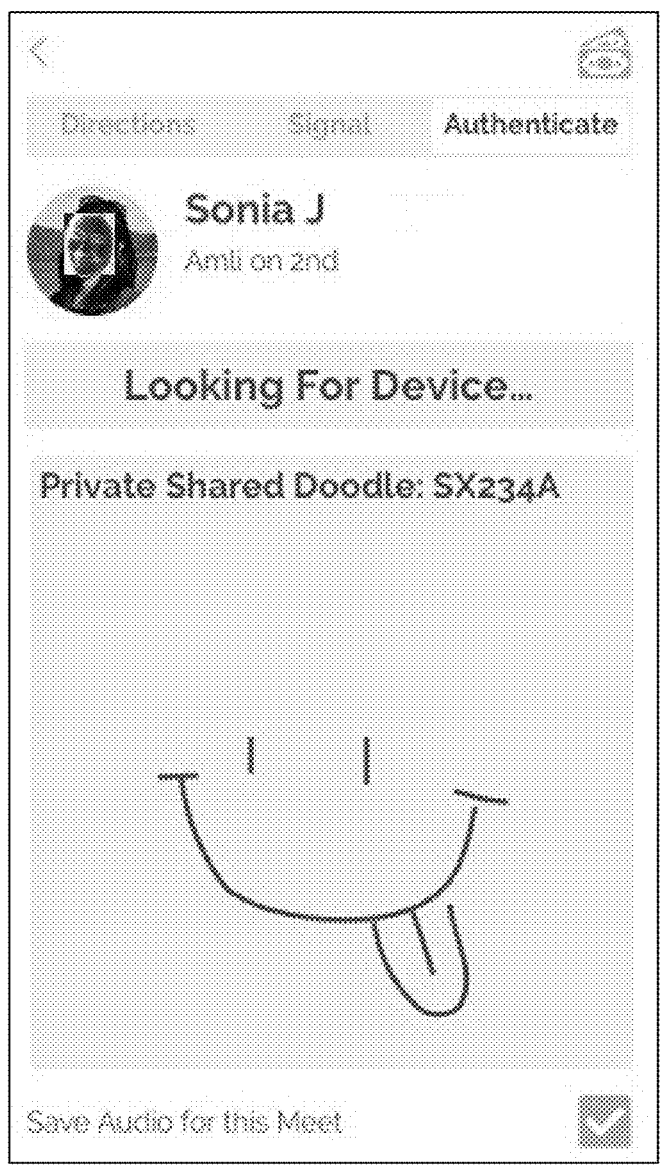

FIG. 6 shows another specialized GUI, illustrating the use of the shared doodle pad, in addition to other authentication and security indicators generated and displayed in accordance with principles of the present invention detailed herein. For example, the GUI of FIG. 6 displays an indicator that the computing device is searching for a matching device of the other party to the meeting.

Figure 7:
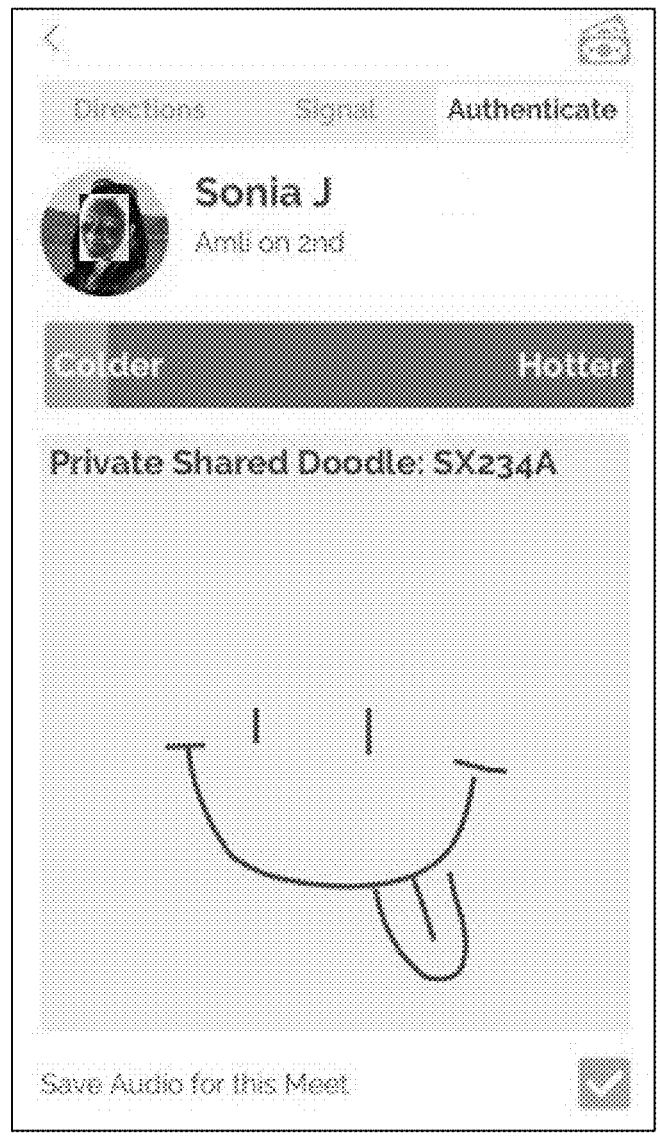

FIG. 7 shows another specialized GUI, illustrating the use of the shared doodle pad, in addition to other authentication and security indicators which are generated and displayed in accordance with principles of the present invention detailed herein after.

Exemplary Scenario

In this example a mom (Sarah) is enjoying date night with her husband and remembers that she needs cash to pay the babysitter. Sarah "makes a wish" for $100 cash from the table in the restaurant. When a bid (supply bid or demand bid) is accepted, the exemplary inventive computer-programmed system of the present invention in real-time debit the account of the buyer electronically and withhold payment to the seller until the buyer has confirmed delivery. The exemplary inventive computer-programmed system of the present invention transfers funds to the seller.

Case 1: Fulfilled from Another Patron

Johnny, is notified of the need since he has subscribed to request notifications at this location. Sarah accepts his bid at $102. Since both phones are within the visual threshold, the exemplary inventive computer-programmed system of the present invention prompts smartphones of both parties instruct parties to wave their signal since the other person is very close. They verify almost instantly. Johnny hands Sarah $100.

Case 2: Fulfilled by Uber Driver

Johnny is an Uber™ driver and monitors the need around him on utilizing an app supported by the exemplary inventive computer-programmed system of the present invention and had his bid of $104 accepted. He's 6.4 miles away so he gets driving directions and when close, the exemplary inventive computer-programmed system of the present invention prompts Sarah, through her smartphone (running the app supported by the exemplary inventive computer-programmed system of the present invention) to wave her signal. When he pulls up to the curb her phone authenticates and he hands her $100.

Case 3: Fulfilled by the Babysitter

The babysitter Kemper subscribed to the wishes in that house's market so she is notified of the wish. Kemper bids it at $100 and marks it for pickup because she'll just give it to Sarah when Sarah gets home. Sarah accepts the bid and gets directions to her own home. When they are close the phones authenticate and Kemper hands Sarah $100. (Sadly, Sarah hands most of it back for babysitting services)

Sample Initial Instructions

To the Stationary Party:

"Yay! Stay put:) We privately shared your location with Johnny and he's headed your way with $100 cash. Please wave him down with the HopSignal when prompted."

To the Traveling Party:

"We're holding $102 for you. Sarah is waiting to confirm your delivery at the following location. She will be presenting this signal: [visual signal description]" Then, follow it with a thumbnail of the SafeMeet Signal based on the primary RGB color from the exemplary inventive computer-programmed system of the present invention. Then, for example, present the thumbnail of the map with click thru to Google Maps™ directions.

Illustrative Operating Environments

Figure 8:
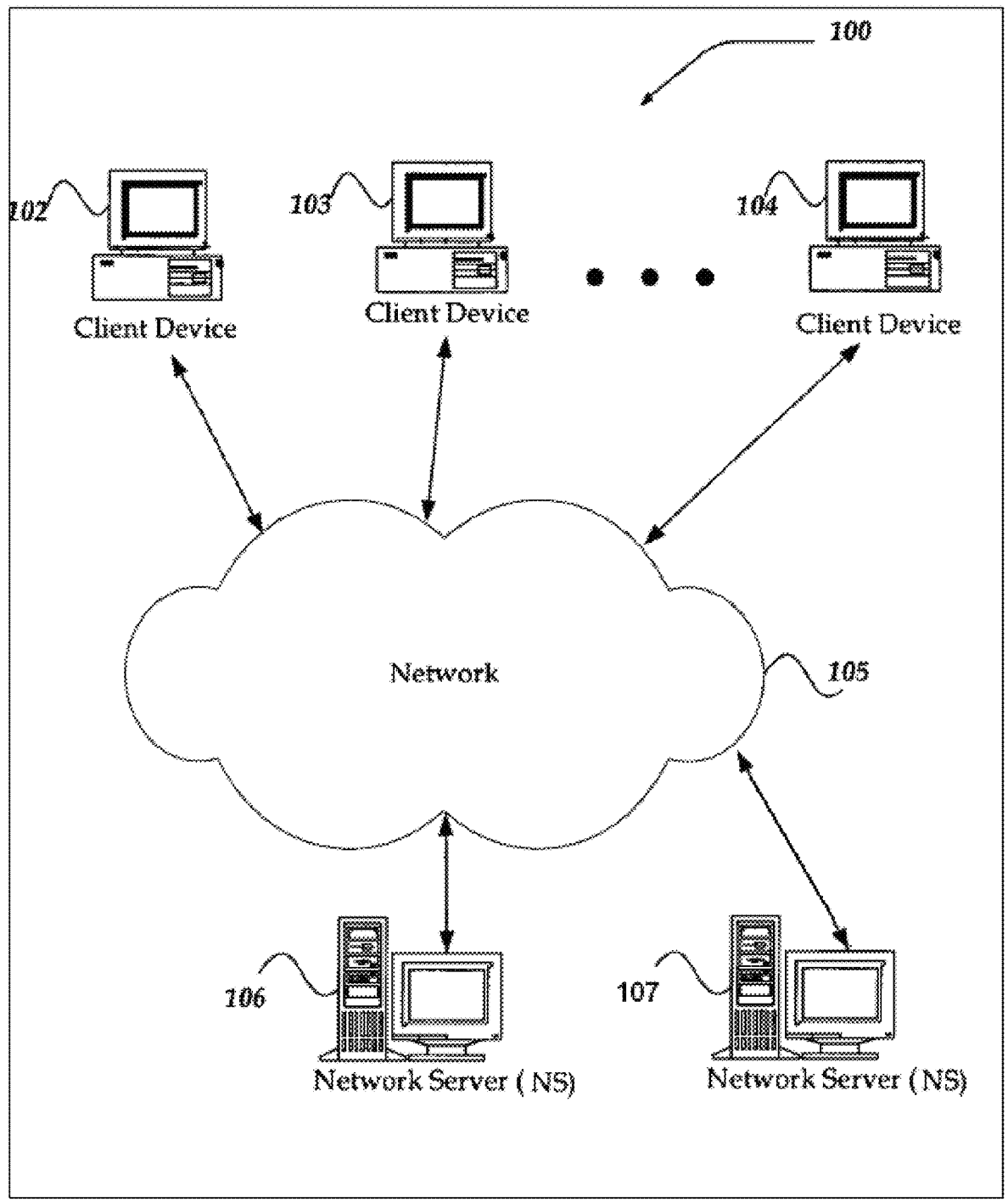
FIGS. 8-11 illustrate certain computer architectures in accordance with some principles of some embodiments of the present invention.

FIG. 8 illustrates one embodiment of an environment in which the exemplary inventive computer-programmed system of the present invention may operate. However, not all of these components may be required to practice the invention, and variations in the arrangement and type of the components may be made without departing from the spirit or scope of the invention. In some embodiments, the inventive system and method may include a large number of members and/or concurrent transactions (e.g., at least 10; at least 100; at least 1,000; at least, 10,000; at least 1,000,000; etc.). In other embodiments, the inventive system and method are based on a scalable computer and network architecture that incorporates varies strategies for assessing the data, caching, searching, and database connection pooling. An example of the scalable architecture is an architecture that is capable of operating multiple servers.

In embodiments, users of the exemplary inventive computer-programmed system of the present invention 102-104 can utilize virtually any computing device (e.g., smartphone) which is specifically programmed to receiving and sending messages over a network, such as network 105, to and from servers 106 and 107, each other, and the like. In embodiments, the set of such devices includes devices that typically connect using a wired communications medium such as personal computers, multiprocessor systems, microprocessor-based or programmable consumer electronics, network PCs, and the like. In some embodiments, the set of such devices also includes devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile device, and the like. Similarly, in some embodiments, client devices 102-104 are any device that is capable of connecting using a wired or wireless communication medium such as a PDA, POCKET PC, wearable computer, and any other device that is equipped to communicate over a wired and/or wireless communication medium.

In embodiments, each member device within member devices 102-104 may include a browser application that is configured to receive and to send web pages, and the like. In embodiments, the browser application may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In embodiments, programming may include either Java, .Net, QT, C, C++ or other suitable programming language.

In embodiments, users' devices 102-104 may be further configured to receive a message from another computing device employing another mechanism, including, but not limited to email, Short Message Service (SMS), Multimedia Message Service (MMS), instant messaging (IM), internet relay chat (IRC), mIRC, Jabber, and the like or a Proprietary protocol.

In embodiments, the network 105 may be configured to couple one computing device to another computing device to enable them to communicate. In some embodiments, the network 105 may be enabled to employ any form of computer readable media for communicating information from one electronic device to another. Also, in some embodiments, the network 105 may include a wireless interface, and/or a wired interface, such as the Internet, in addition to local area networks (LANs), wide area networks (WANs), direct connections, such as through a universal serial bus (USB) port, other forms of computer-readable media, or any combination thereof. In some embodiments, on an interconnected set of LANs, including those based on differing architectures and protocols, a router may act as a link between LANs, enabling messages to be sent from one to another.

Also, in some embodiments, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, in some embodiments, remote computers and other related electronic devices could be remotely connected to either LANs or WANs via a modem and temporary telephone link.

In essence, in some embodiments, the network 105 includes any communication method by which information may travel between client devices 102-104, and servers 106 and 107.

Figure 9:
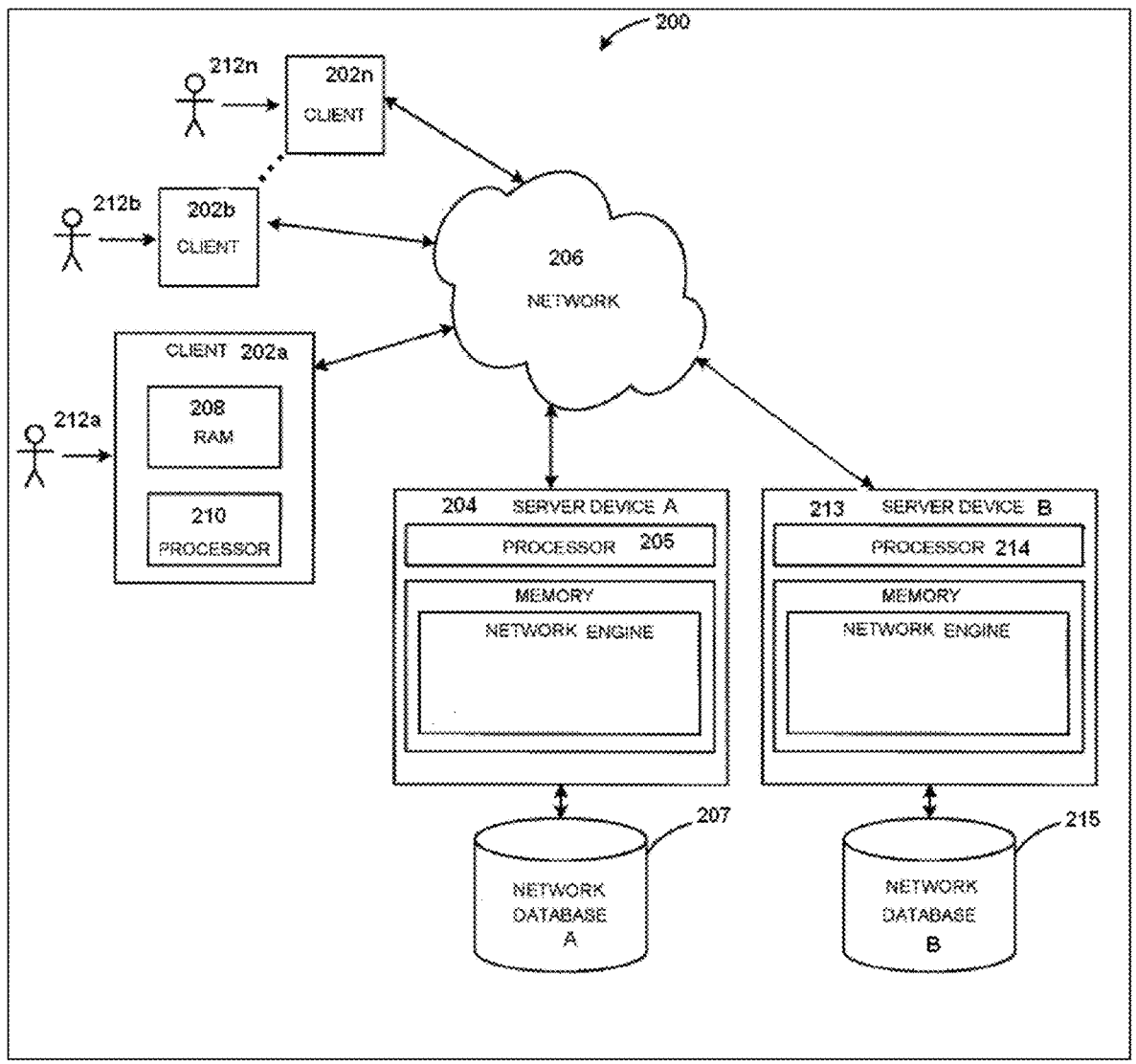

FIG. 9 shows another exemplary embodiment of the computer and network architecture that can support the exemplary inventive specifically programmed computing devices, the exemplary inventive computer-programmed systems, and the exemplary inventive computer-processing methods of the present invention. In some embodiments, the user devices 202a, 202b thru 202n shown each at least includes a computer-readable medium, such as a random access memory (RAM) 208 coupled to a processor 210 or FLASH memory. In some embodiments, the processor 210 may execute computer-executable program instructions stored in memory 208. In some embodiments, such processors comprise a microprocessor, an ASIC, and state machines. In some embodiments, such processors comprise, or may be in communication with, media, for example computer-readable media, which stores instructions that, when executed by the processor, cause the processor to perform the steps described herein.

In some embodiments, types of computer-readable media may include, but are not limited to, an electronic, optical, magnetic, or other storage or transmission device capable of providing a processor, such as the processor 210 of client 202a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, and JavaScript.

In some embodiments, member devices 202a-n may also comprise a number of external or internal devices such as a mouse, a CD-ROM, DVD, a keyboard, a display, or other input or output devices. Examples of client devices 202a-n may be personal computers, digital assistants, personal digital assistants, cellular phones, mobile phones, smart phones, pagers, digital tablets, laptop computers, Internet appliances, and other processor-based devices. In general, a client device 202a may be any type of processor-based platform that is connected to a network 206 and that interacts with one or more application programs. Client devices 202a-n may operate on any operating system capable of supporting a browser or browser-enabled application, such as Microsoft™, Windows™, or Linux. In some embodiments, the client devices 202a-n shown may include, for example, personal computers executing a browser application program such as Microsoft Corporation's Internet Explorer™, Apple Computer, Inc.'s Safari™, Mozilla Firefox, and Opera. Through the client devices 202a-n, users, 212a-n communicate over the network 206 with each other and with other systems and devices coupled to the network 206. As shown in FIG. 9, server devices 204 and 213 may be also coupled to the network 206. In an embodiment of the present invention, one or more clients can be a mobile client.

In some embodiments, the term "mobile electronic device" may refer to any portable electronic device that may or may not be enabled with location tracking functionality. For example, a mobile electronic device can include, but is not limited to, a mobile phone, Personal Digital Assistant (PDA), Blackberry™, Pager, Smartphone, or any other reasonable mobile electronic device. For ease, at times the above variations are not listed or are only partially listed, this is in no way meant to be a limitation.

In some embodiments, the terms "proximity detection," "locating," "location data," "location information," and "location tracking" as used herein may refer to any form of location tracking technology or locating method that can be used to provide a location of a mobile electronic device, such as, but not limited to, at least one of location information manually input by a user, such as, but not limited to entering the city, town, municipality, zip code, area code, cross streets, or by any other reasonable entry to determine a geographical area; Global Positions Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed, this is in no way meant to be a limitation.

In some embodiments, near-field wireless communication (NFC) can represent a short-range wireless communications technology in which NFC-enabled devices are "swiped," "bumped," "tap" or otherwise moved in close proximity to communicate. In some embodiments, NFC could include a set of short-range wireless technologies, typically requiring a distance of 10 cm or less.

In some embodiments, NFC may operate at 13.56 MHz on ISO/IEC 18000-3 air interface and at rates ranging from 106 kbit/s to 424 kbit/s. In some embodiments, NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, NFC peer-to-peer communication can be conducted when a plurality of NFC-enable devices within close proximity of each other.

Figure 10:
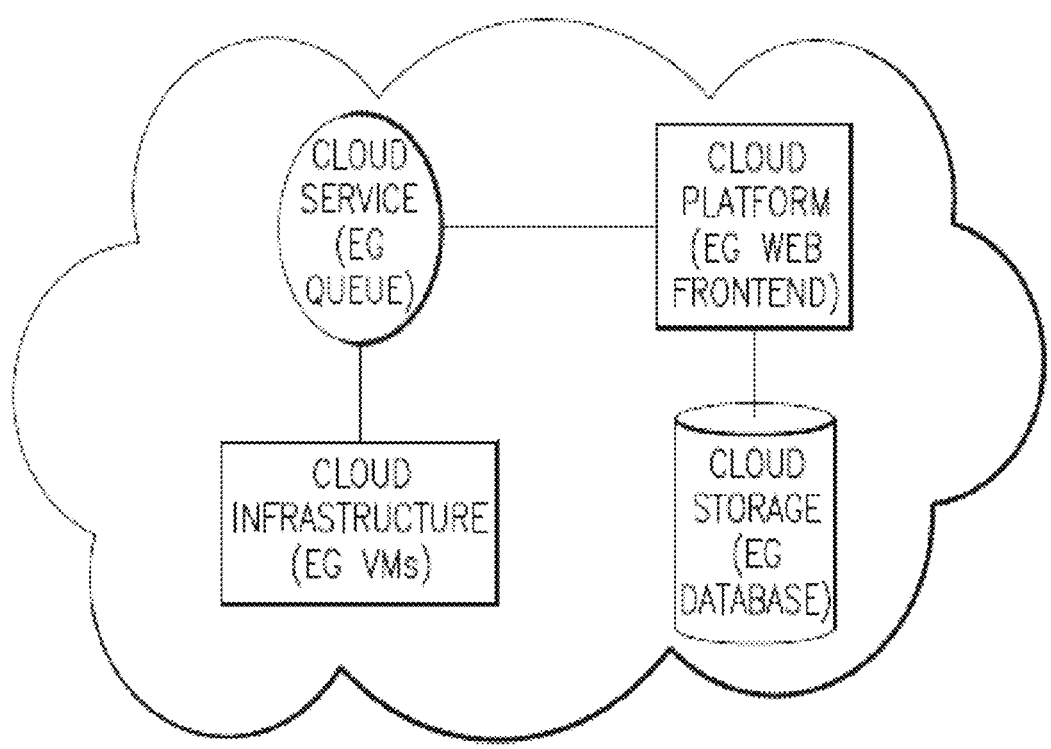
Figure 11:
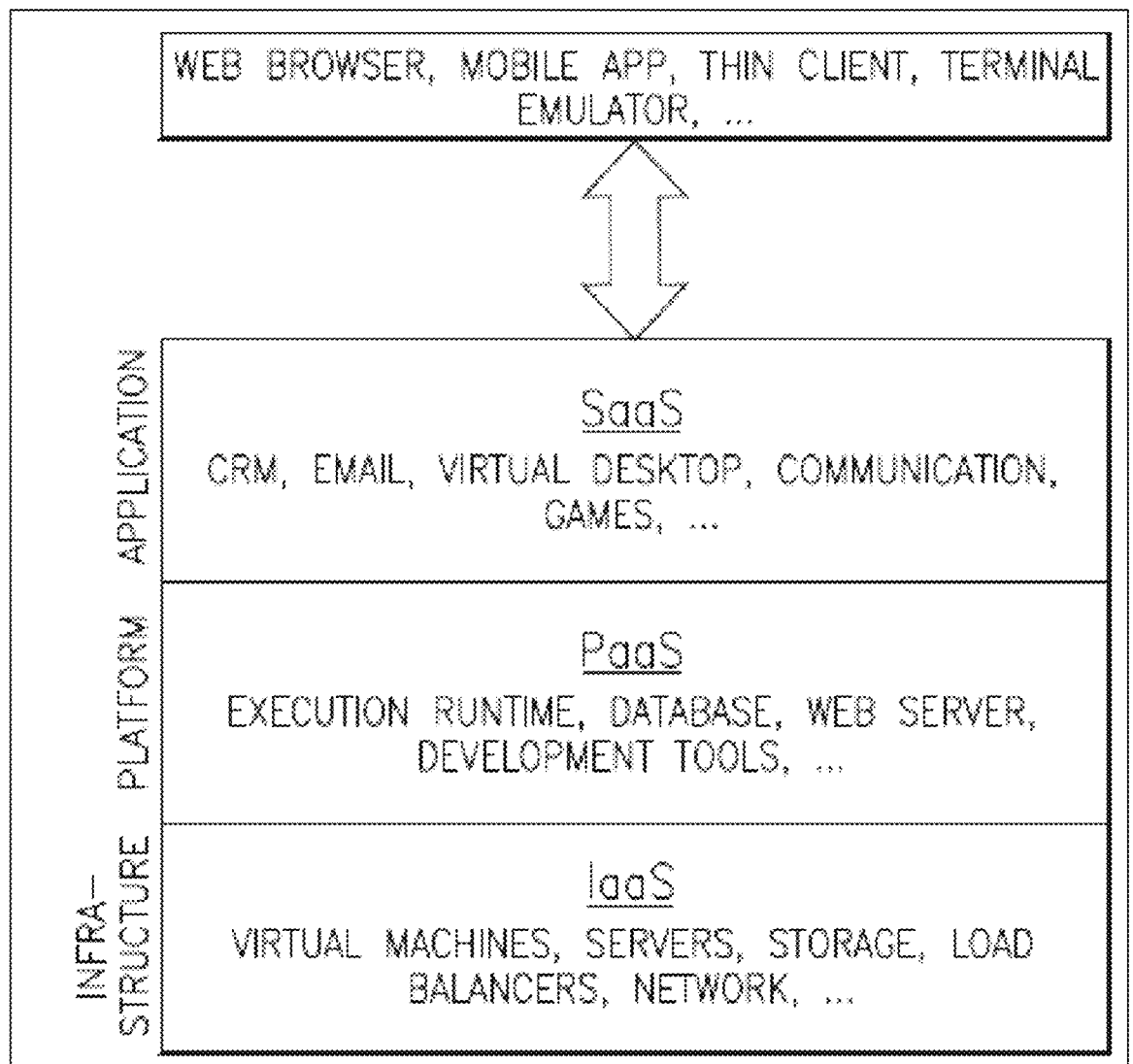

For purposes of the instant description, the terms "cloud," "Internet cloud," "cloud computing," "cloud architecture," and similar terms correspond to at least one of the following utilized by the exemplary inventive computer-programmed systems and the exemplary inventive computer-processing methods of the present invention: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user). In some embodiments, the inventive computer flexible lease basis system offers/manages the cloud computing/architecture as, but not limiting to: infrastructure a service (IaaS), platform as a service (PaaS), and software as a service (SaaS). FIGS. 10 and 11 illustrate schematics of exemplary implementations of the cloud computing/architecture.

In some embodiments, the present invention provides for a computer system which includes at least the following components: a plurality of computing devices associated with a plurality of users associated with a plurality of users; where the plurality of users is at least one hundred concurrent users; where each computing device of the plurality of computing devices is configured to: electronically receive software which, when being executed, cause such computing device to display a plurality of instances of a specifically programmed graphical user interface (GUI); where each instance of the GUI is configured to display a real-time updatable meeting information representative of a direct electronic proximity-based communication between at least two computing devices associated with at least two users who desire to meet at a particular location to engage in a transaction of at least one good, at least one service, or both, whose marketable value lasts for a period of 30 seconds to 60 minutes; where the meeting information includes: 1) a first data representative of the particular location; 2) a second data representative of at least one unique user authentication identifier, which has been assigned to: i) a particular computing device of the at least two computing devices or ii) the at least two computing devices; and 3) a third data representative of a real-time adjustable visual indicator, allowing the least two users to visually identify each other computing devices, where the real-time adjustable visual indicator has been uniquely assigned based, at least in part, on at least one other visual indicator being assigned to at least one other computing device to be located in a visual vicinity of the particular location at which the at least two users to meet; where each computing device of the at least two computing devices of the at least two users is further configured to: electronically receive an indication that the at least two users who desire to meet to engage in the transaction of the at least one good, the at least one service, or both, whose marketable value lasts for the period of 30 seconds to 60 minutes; electronically establish the direct electronic proximity-based communication between the at least two computing devices; dynamically determine, in real time, the first data, the second data, and the third data of the meeting information; and dynamically control, based on the meeting information, a visual appearance of the GUI to facilitate the at least two users to meet at the particular location.

In some embodiments, the meeting information includes a fourth data representative of a real-time sharable drawing pad which is shared among the at least two computing devices associated with the at least two users. In some embodiments, the meeting information includes a fifth data representative of an amount of desired compensation for the at least one good, the at least one service, or both; and where each computing device of the at least two computing devices of the at least two users is further configured to dynamically adjust, in real time, the fifth data based on a time which takes for the at least two users to meet.

In some embodiments, the meeting information is configured to maintain an anonymity of the at least two users from each other. In some embodiments, the real-time adjustable visual indicator is one of: color, text, image, and or any combination thereof.

In some embodiments, a first computing device of the at least two computing devices of the at least two users is further configured to display a first real-time adjustable visual indicator including at least one first color; where a second computing device of the at least two computing devices of the at least two users is further configured to display a second real-time adjustable visual indicator including at least one second color; and where the at least one first color is distinct from the at least one second color.

In some embodiments, the second computing device of the at least two computing devices of the at least two users is further configured to dynamically determine the at least one second color based on a random number based algorithm.

In some embodiments, each real-time adjustable visual indicator is displayed over a half of a screen of each computing device of the at least two computing devices of the at least two users.

In some embodiments, each real-time adjustable visual indicator is displayed after the at least two computing devices have established the direct electronic proximity-based communication. In some embodiments, each real-time adjustable visual indicator is displayed by undimming a respective screen of a respective computing device.

In some embodiments, the direct electronic proximity-based communication includes a transmission of the at least one unique user authentication identifier. In some embodiments, the direct electronic proximity-based communication includes at least one of: direct Bluetooth transmissions and direct transmissions at an inaudible audio frequency.

In some embodiments, the first data includes a textual direction, a visual direction, or both, from the current location of the particular user to the particular location at which the at least two users to meet. In some embodiments, the first data includes a distance from a current location of a particular user to the particular location at which the at least two users to meet.

In some embodiments, the present invention provides for a computer-implemented method which includes at least the following steps of: electronically receiving, by each computing device of a plurality of computing devices associated with a plurality of users, software which, when being executed, cause such computing device to display a plurality of instances of a specifically programmed graphical user interface (GUI); where the plurality of users is at least one hundred concurrent users; where each instance of the GUI is configured to display a real-time updatable meeting information representative of a direct electronic proximity-based communication between at least two computing devices associated with at least two users who desire to meet at a particular location to engage in a transaction of at least one good, at least one service, or both, whose marketable value lasts for a period of 30 seconds to 60 minutes; where the meeting information includes: 1) a first data representative of the particular location; 2) a second data representative of at least one unique user authentication identifier, which has been assigned to: i) a particular computing device of the at least two computing devices or ii) the at least two computing devices; and 3) a third data representative of a real-time adjustable visual indicator, allowing the least two users to visually identify each other computing devices, where the real-time adjustable visual indicator has been uniquely assigned based, at least in part, on at least one other visual indicator being assigned to at least one other computing device to be located in a visual vicinity of the particular location at which the at least two users to meet; electronically receiving, by each of the at least two computing devices of the at least two users, an indication that the at least two users who desire to meet to engage in the transaction of the at least one good, the at least one service, or both, whose marketable value lasts for the period of 30 seconds to 60 minutes; electronically establishing, by each of the at least two computing devices of the at least two users, the direct electronic proximity-based communication between the at least two computing devices; dynamically determining, in real time, by each of the at least two computing devices of the at least two users, the first data, the second data, and the third data of the meeting information; and dynamically controlling, by each of the at least two computing devices of the at least two users, based on the meeting information, a visual appearance of the GUI to facilitate the at least two users to meet at the particular location.

Of note, the embodiments described herein may, of course, be implemented using any appropriate hardware and/or computing software languages. In this regard, those of ordinary skill in the art are well versed in the type of computer hardware that may be used (e.g., a mainframe, a mini-computer, a personal computer ("PC"), a network (e.g., an intranet and/or the internet)), the type of computer programming techniques that may be used (e.g., object oriented programming), and the type of computer programming languages that may be used (e.g., C++, Basic, AJAX, Javascript). The aforementioned examples are, of course, illustrative and not restrictive.

While a number of embodiments of the present invention have been described, it is understood that these embodiments are illustrative only, and not restrictive, and that many modifications may become apparent to those of ordinary skill in the art. Further still, the various steps may be carried out in any desired order (and any desired steps may be added and/or any desired steps may be eliminated).

What is claimed is:

1. A computer-implemented method, comprising:
   causing to display, by each computing device of at least two computing devices associated with at least two users an instance of a specifically programmed graphical user interface (GUI);
   wherein each instance of the GUI is configured to display a real-time updatable meeting information representative of a direct electronic proximity-based communication between the at least two computing devices associated with the at least two users who desire to meet at a particular location to engage in a transaction of at least one good, at least one service, or both;
   wherein the meeting information comprises a real-time adjustable identifier, allowing the least two users to identify each other computing devices, wherein the real-time adjustable identifier has been uniquely assigned based, at least in part, on at least one other identifier being assigned to at least one other computing device to be located in a vicinity of the particular location at which the at least two users to meet;
   receiving, by each of the at least two computing devices of the at least two users, an indication that the at least two users who desire to meet to engage in the transaction of the at least one good, the at least one service, or both;
   establishing, by each of the at least two computing devices of the at least two users, the direct electronic proximity-based communication between the at least two computing devices;
   dynamically controlling, by each of the at least two computing devices of the at least two users, based on the meeting information, the GUI to facilitate the at least two users to meet at the particular location; and
   wherein the GUI comprises the real-time adjustable identifier.

2. The computer-implemented method of claim 1, wherein the real-time adjustable identifier is a real-time adjustable visual indicator.

3. The computer-implemented method of claim 2, wherein the real-time adjustable visual indicator is one of: color, text, image, or any combination thereof.

4. The computer-implemented method of claim 3, further comprising:
   displaying, by a first computing device of the at least two computing devices of the at least two users, a first real-time adjustable visual indicator comprising at least one first color;
   displaying, by a second computing device of the at least two computing devices of the at least two users, a second real-time adjustable visual indicator comprising at least one second color; and
   wherein the at least one first color is distinct from the at least one second color.

5. The computer-implemented method of claim 4, further comprising:
   dynamically determining, by the second computing device of the at least two computing devices of the at least two users, the at least one second color based on a random number based algorithm.

6. The computer-implemented method of claim 4, wherein each real-time adjustable visual indicator is displayed over a half of a screen of each computing device of the at least two computing devices of the at least two users.

7. The computer-implemented method of claim 4, wherein each real-time adjustable visual indicator is displayed after the at least two computing devices have established the direct electronic proximity-based communication.

8. The computer-implemented method of claim 4, wherein each real-time adjustable visual indicator is displayed by undimming a respective screen of a respective computing device.

9. The computer-implemented method of claim 1, wherein the meeting information comprises data representative of a real-time sharable drawing pad which is shared among the at least two computing devices associated with the at least two users.

10. The computer-implemented method of claim 1, wherein the meeting information comprises data representative of an amount of desired compensation for the at least one good, the at least one service, or both; and further comprising dynamically adjusting, in real time, by each of the at least two users, the data based on a time taken for the at least two users to meet.

11. The computer-implemented method of claim 1, wherein the meeting information is configured to maintain an anonymity of the at least two users from each other.

12. The computer-implemented method of claim 1, wherein the direct electronic proximity-based communication comprises a transmission of at least one unique user authentication identifier.

13. The computer-implemented method of claim 1, wherein the direct electronic proximity-based communication comprises at least one of: direct Bluetooth transmissions and direct transmissions at an inaudible audio frequency.

14. The computer-implemented method of claim 1, wherein the meeting information comprises a textual direction, a visual direction, or both, from a current location of a particular user to the particular location at which the at least two users desire to meet.

15. The computer-implemented method of claim 1, wherein the meeting information comprises a distance from a current location of a particular user to the particular location at which the at least two users desire to meet.

16. The computer-implemented method of claim 1, wherein receiving the indication comprises receiving an indication whose marketable value lasts for a period of 30 second to 60 minutes.

17. A system, comprising:
a plurality of computing devices associated with a plurality of users associated with a plurality of users;
wherein each computing device of the plurality of computing devices is configured to:
display an instance of a specifically programmed graphical user interface (GUI);
wherein each instance of the GUI is configured to display a real-time updatable meeting information representative of a direct electronic proximity-based communication between the at least two computing devices associated with the at least two users who desire to meet at a particular location to engage in a transaction of at least one good, at least one service, or both;
wherein the meeting information comprises a real-time adjustable identifier, allowing the least two users to identify each other computing devices, wherein the real-time adjustable identifier has been uniquely assigned based, at least in part, on at least one other identifier being assigned to at least one other computing device to be located in a vicinity of the particular location at which the at least two users to meet;
wherein each computing device of the at least two computing devices associated with the at least two users is further configured to:
receive an indication that the at least two users who desire to meet to engage in the transaction of the at least one good, the at least one service, or both;
establish the direct electronic proximity-based communication between the at least two computing devices;
dynamically control, based on the meeting information, the GUI to facilitate the at least two users to meet at the particular location; and
wherein the GUI comprises the real-time adjustable identifier.

18. The system of claim 17, wherein the real-time adjustable identifier is a real-time adjustable visual indicator.

19. The system of claim 18, wherein the real-time adjustable visual indicator is one of:
color, text, image, or any combination thereof.

20. The system of claim 19, wherein a first computing device of the at least two computing devices of the at least two users is further configured to display a first real-time adjustable visual indicator comprising at least one first color;
wherein a second computing device of the at least two computing devices of the at least two users is further configured to display a second real-time adjustable visual indicator comprising at least one second color; and
wherein the at least one first color is distinct from the at least one second color.

21. The system of claim 20, wherein the second computing device of the at least two computing devices of the at least two users is further configured to dynamically determine the at least one second color based on a random number based algorithm.

22. The system of claim 20, wherein each real-time adjustable visual indicator is displayed over a half of a screen of each computing device of the at least two computing devices of the at least two users.

23. The system of claim 20, wherein each real-time adjustable visual indicator is displayed after the at least two computing devices have established the direct electronic proximity-based communication.

24. The system of claim 20, wherein each real-time adjustable visual indicator is displayed by undimming a respective screen of a respective computing device.

25. The system of claim 17, wherein the meeting information comprises data representative of a real-time sharable drawing pad which is shared among the at least two computing devices associated with the at least two users.

26. The system of claim 17, wherein the meeting information comprises data representative of an amount of desired compensation for the at least one good, the at least one service, or both; and further comprising dynamically adjusting, in real time, by each of the at least two users, the data based on a time taken for the at least two users to meet.

27. The system of claim 17, wherein the meeting information is configured to maintain an anonymity of the at least two users from each other.

28. The system of claim 17, wherein the direct electronic proximity-based communication comprises a transmission of at least one unique user authentication identifier.

29. The system of claim 17, wherein the direct electronic proximity-based communication comprises at least one of: direct Bluetooth transmissions and direct transmissions at an inaudible audio frequency.

30. The system of claim 17, wherein the meeting information comprises a textual direction, a visual direction, or both, from a current location of a particular user to the particular location at which the at least two users desire to meet.

31. The system of claim 17, wherein the meeting information comprises a distance from a current location of a particular user to the particular location at which the at least two users desire to meet.

32. The system of claim 17, wherein each computing device of the at least two computing devices associated with the at least two users is configured to receive the indication whose marketable value lasts for a period of 30 second to 60 minutes.

* * * * *